United States Patent [19]

Radmanovich

[11] Patent Number: 5,231,789
[45] Date of Patent: Aug. 3, 1993

[54] AERATED BAIT CONTAINER

[76] Inventor: Theodore J. Radmanovich, 1912 Berlinger Dr., Waco, Tex. 76710

[21] Appl. No.: 808,476

[22] Filed: Dec. 16, 1991

[51] Int. Cl.$^5$ .............................................. A01K 97/00
[52] U.S. Cl. ........................................ 43/57; 261/121.2
[58] Field of Search ........................... 43/56, 57, 55; 261/121.2

[56] References Cited

U.S. PATENT DOCUMENTS

| | | | |
|---|---|---|---|
| 417,979 | 12/1889 | Borcherdt | 43/57.1 |
| 668,507 | 2/1901 | Fisk | 43/57 |
| 913,379 | 2/1909 | Hart | 43/57 |
| 2,151,225 | 3/1939 | Newton | 261/121.2 |
| 2,885,819 | 5/1959 | Newell et al. | |
| 2,960,321 | 11/1960 | Stoots, Jr. | |
| 3,401,671 | 9/1968 | Axelrod et al. | |
| 3,835,575 | 9/1974 | Kelley et al. | |
| 4,353,182 | 10/1982 | Junkas et al. | |
| 4,462,180 | 7/1984 | Scott | |
| 4,541,539 | 9/1985 | Matthews | |
| 4,615,137 | 10/1986 | Radmanovich | 43/57 |
| 5,050,526 | 9/1991 | Nelson et al. | 43/57 |

Primary Examiner—Mark Rosenbaum
Assistant Examiner—James Miner
Attorney, Agent, or Firm—Haugen and Nikolai

[57] ABSTRACT

A combination dry bait container and aerator apparatus which is adaptable to an inside wall of a commercially available, off-the-shelf, thermally insulated chest-type coolers. The apparatus includes a plastic molded insert having several small compartments formed therein, wherein each compartment opens only to the top thereof. The apparatus is adapted to be received into the reservoir of the insulated cooler and is selectively attachable to one of the side walls thereof. A battery-powered aeration pump is disposed in one of the small compartments defined in the insert and is coupled in air flow communication with the reservoir of the cooler containing water and live bait, such as minnows and leeches. The aeration pump supplies air to the water and thereby aerates the water to ensure the longevity of the live bait. The present invention also shields the live bait from extreme environments such as direct sunlight, or extreme and sub-zero temperature conditions. It is easily manufactured and requires relatively small tooling costs. It is also portable and can be adapted to any number of differently sized specified insulated coolers. Other small compartments defined in the insert can be used to store dry bait, such as worms or frozen smelt, but can also be used to store food or beverages.

9 Claims, 3 Drawing Sheets

AERATED BAIT CONTAINER

BACKGROUND OF THE INVENTION

1. Field of the Invention

The present invention relates to live bait containers and, in particular, to a portable aerated bait container which is adaptable to existing, off-the-shelf coolers for simultaneously maintaining the life of various bait types, such as minnows, shrimp, crayfish, frogs, leeches, nightcrawlers, grubs, and the like.

2. Discussion of the Prior Art

As described in my previously issued U.S. Pat. No. 4,615,137, which teaches an energy-efficient aerated bait container, fishermen often carry a variety of live baits to provide a selection of bait appropriate for existing fishing conditions. In that patent, I disclose a thermally insulative housing having several integral compartments and an aeration device integrally positioned therewithin. This invention is highly effective for oxygenating water contained therein, shading the bait from the sun, and maintaining the bait in a cool environment to increase the longevity of a variety of live baits. In sub-zero temperatures, the aeration of the water will prevent freezing as well as increase activity of the bait. The unitary housing insert is uniquely designed and requires special and relatively high cost tooling (molds) to manufacture such an insert.

Most fishermen already own one or several small- to medium-sized insulated chest-type coolers for storing different types of food and beverages on ice. Baits, such as nightcrawlers or leeches, are usually stored in separate dirt or water-filled insulating containers, such as small styrofoam buckets. Food coolers standing alone provide good shading characteristics and maintain a consistent cool environment in hot weather for baits contained in styrofoam vessels, but they lack the aeration capability to sustain the life of minnows and other live bait for an extended period of time.

Therefore, an advantage resides in providing an inexpensive aeration device which is adapted to be installed in a variety of standard, off-the-shelf specified food/beverage coolers to thereby provide an improved bait storage container. Such a device eliminates the need for special tooling required to manufacture custom designed insulating fishing bait containers.

Some examples of previously known portable bait containers can be seen by directing attention to various U.S. Patents. In particular, U.S. Pat. No. 2,960,321 issued to Stoots teaches a portable aerator. While not specifically disclosed therein, such a device could be disposed within a previously-owned cooler to aerate water contained therein to sustain the life of baits, such as minnows, an extended period of time. However, such a device, used in combination with an existing cooler, does not provide for a dry compartment to store other baits which ar not to be submerged in water, such as nightcrawlers, frozen smelt, and the like.

U.S. Pat. No. 4,462,180 issued to Scott teaches a bait container with an integrally formed chamber for receiving an aerator. However, while this patent teaches a container having both an aeration device and a compartment for holding live bait, such as minnows, the bait container taught therein is relatively complex and built-in. Therefore, tooling costs would be expensive. Further, the bait container is not adapted to be used with a commercially available off-the-shelf, inexpensive unit such as a Rubbermaid ®, an Igloo ®, or a Colemar ® cooler.

U.S. Pat. No. 3,835,575 to Kelley et al. teaches a renewable bait and tackle container having an integrally defined drawer for receiving an air pump. Again, the design of this container is relatively complex and requires expensive tooling, which makes the apparatus is relatively expensive to manufacture, thus increasing the final sale price of the container to the fisherman. Further, the apparatus is not designed to be used with inexpensive and currently owned off-the-shelf insulating coolers.

OBJECTS

It is accordingly an object of the present invention to provide an inexpensive combination dry storage container and aeration apparatus.

It is a further object of the present invention to provide a combination dry storage and aeration apparatus which is easily attachable to and removable from a standard specified off-the-shelf insulated container.

It is a further object of the present invention to provide a combination storage and aeration apparatus having substantially reduced tooling costs and which is relatively simple in construction.

SUMMARY OF THE INVENTION

The foregoing objects and advantages of the present invention are achieved by providing a bait aeration apparatus in the form of an insert having integrally formed compartments with a removable aeration device disposed in one of the compartments. The insert with the aerator apparatus is adapted to be installed on an inside wall of a variety of commercially available off-the-shelf chest-type coolers of the type manufactured by Rubbermaid ®. The insert, insertable into the cooler, includes several integrally formed minor compartments, wherein each minor compartment opens only to the top thereof. A battery-powered air pump is positioned within a first one of the small minor compartments of the insert and is coupled in air flow communication with the major compartment of the insulated cooler. The pump means supplies air to water contained in the major compartment of the cooler, thereby aerating the water to sustain the life of live bait. The insert can be easily and inexpensively manufactured using plastic injection molding techniques. The apparatus preferably includes an elongated passageway disposed through an outer wall of the first one of the minor compartments between the pump and the major compartment and terminating at a bottom surface of the major compartment through an air diffuser.

The apparatus preferably includes a separable fastener, such as Dual-Lock ® reclosable fasteners manufactured by 3M Corporation, attached to an outer surface of a first side wall of the insert and adapted to be attached to an inside surface of a side wall of the major compartment of the cooler housing. Thus, the apparatus of the present invention is easily adapted to the walls of any number of different thermally insulated coolers of specified size. Since the invention is removable, the cooler is not strictly limited to use as a live minnow bucket, but can also be used for carrying food and beverages.

The present invention preferably includes a dampening member, such as a foam pad, positioned between the pump and an adjacent inner wall of the first one of the minor compartments receiving the pump to reduce vibration from the pump to the insert in which it is positioned.

The insert also preferably includes a second side wall positioned opposite the first wall and which extends beyond a bottom of the insert for supporting an outer portion of the insert off the floor of the cooler.

The foregoing features, objects, and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
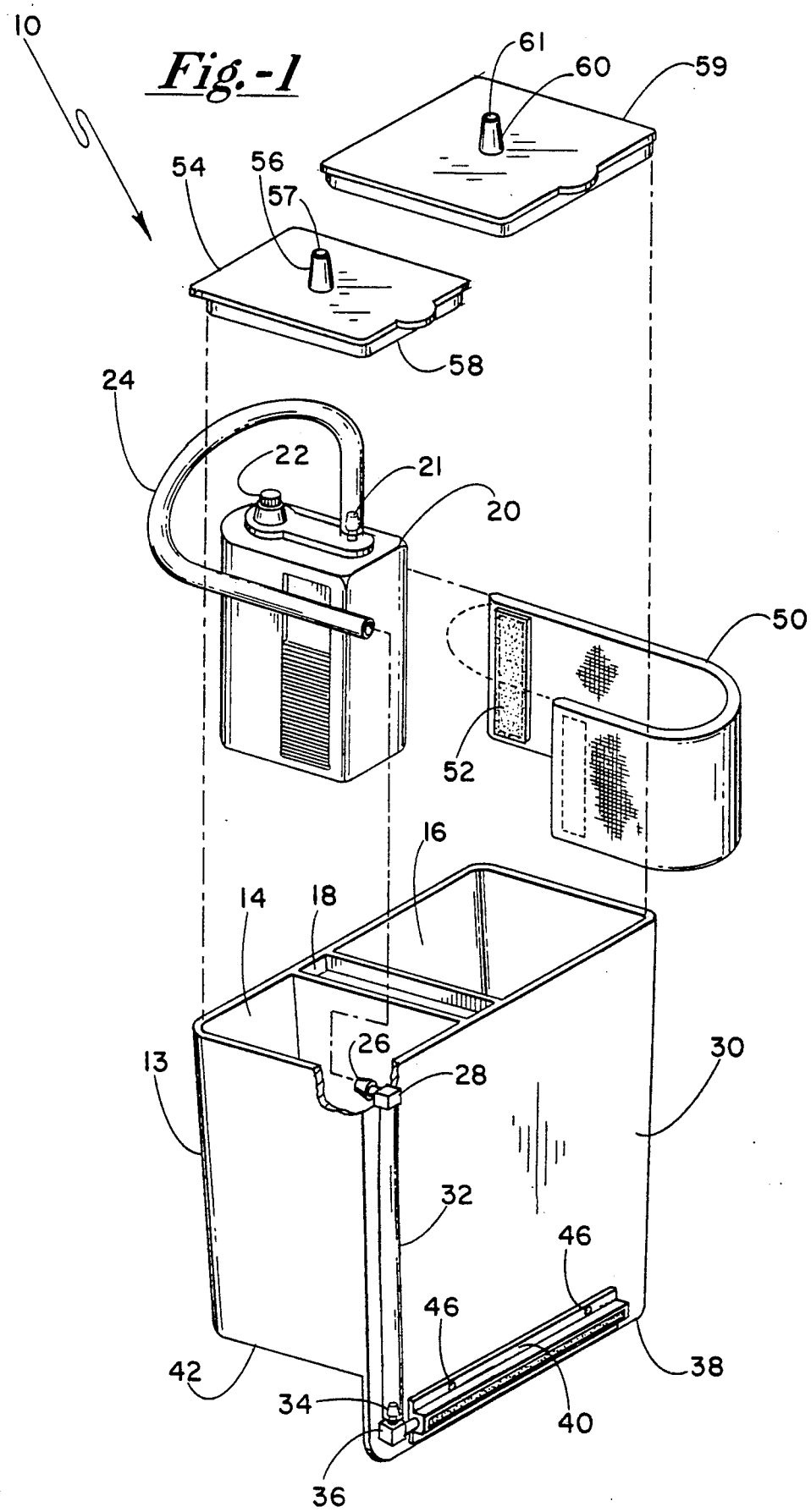
FIG. 1 is an exploded perspective view of the present invention adapted to be received within a commercially available insulative housing, such as a chest-type cooler.

A perspective view of a combination container and aeration apparatus adapted to be used with a conventional chest-type cooler according to the present invention is shown in FIG. 1 and is indicated generally at 10. Container 10 is adapted to be securingly received within the cooling compartment 11 of an insulated box 12 (see FIG. 2), such as a commercially available chest-type cooler. The container insert 10 comprises a plastic molded body 13 having a first rectangular compartment 14 and a second separate rectangular compartment 16, each having an open top and joined by an integrally formed rib with a shallow rectangular recess 18 providing structural reinforcement therebetween. The first compartment 14 receives a battery-operated aeration device 20 containing a low power air pump, such as a piston or a diaphragm-type pump, which is well known in the art and typically used with small aquariums. Aeration device 20 includes an on-off switch 22 and provides air from an integral nipple 21 via a tube 24 to a nipple 26 of a 90° elbow wall connector 28. Wall connector 28 is securingly inserted through an opening in a front wall 30 of body 13 in a sealed relation so as to prevent water from inadvertently entering compartment 14. A flexible tube 32 extends vertically along the outside surface of wall 30 from connector 28 downward to a nipple 34 of a 90° connector elbow 36. Connector 36 is attached to a lower portion 38 of wall 30 and is coupled to a rigid air diffuser 40. Diffuser 40 extends horizontally along lower portion 38 of wall 30 and faces outward toward a center of reservoir 11 defined by thermally insulated cooler 12. Thus, air is communicated from aeration device 20 via tube 24, connector 28, tube 32, connector 36 to diffuser 40 such that air is dispersed evenly along a length of diffuser 40 into water contained within reservoir 11.

Wall 30 extends below a bottom surface 42 of first and second compartments 14 and 16, respectively, such that lower portion 38 of wall 30 forms a plate-like flange to receive several fasteners 46 disposed therethrough, such as rivets, to securingly attach diffuser 40 to lower portion 38 of wall 30. Lower portion 38 also supports an outer portion of body 13 and prevents bait from hiding under bottom surface 42 of container 10 as will be described shortly.

An elongated sound deadening pad 50, such as a foam pad, having mating velcro strips 52 disposed at each end of pad 50, is wrapped around aeration device 20 in a snug relationship and resides between aeration device 20 and adjacent inner walls of reservoir 14. Pad 50 dampens vibration of the aeration device 20 to body 13, and also reduces noise generated by aeration device 20. A lid 54 having a protruding lift 56 with an air hole 57 defined therethrough has a lower rectangular flange 58 formed to mount with a friction fit over the top of compartment 14. A second lid 59 having a protruding lift 60 with an air hole 61 is similarly adapted to fit onto the a top of the second compartment 16. Both lids 54 and 59 are preferably comprised of plastic such as high impact polystyrene, as is body 13.

Second compartment 16 is a wet or dry compartment and is intended for bait such as nightcrawlers, frogs, or other live bait that require a dry or slightly moist environment. Compartment 16 could also be used to store food, such as sandwiches or snacks, or beverages which are intended to be kept dry from water contained in reservoir 11 of cooler 12. First compartment 14 is also a dry compartment and provides a dry recess for aeration device 20. It is recognized, however, that several compartments could be formed in place of the single compartment 16 to provide a number of storage spaces, some of which could even include a small quantity of water for maintaining and confining live bait such as leeches.

Body 13 is preferably manufactured using plastic injection molding techniques, thus making manufacturing simple and relatively inexpensive, which lowers the cost of the invention, making it highly affordable to the average fisherman.

Figure 2:
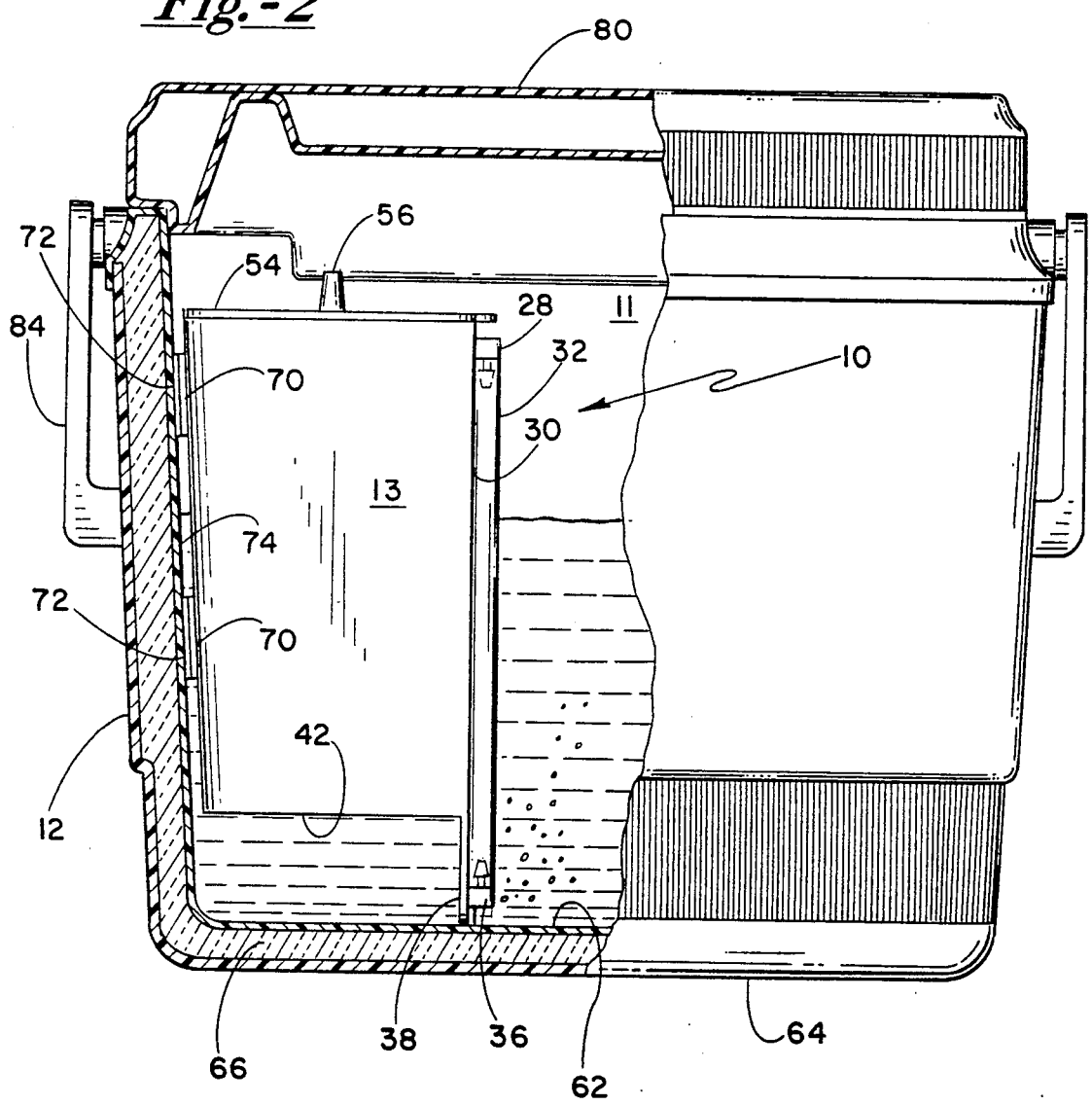
FIG. 2 shows a partial sectional front view of the present invention disposed within a chest-type cooler.

Referring to FIG. 2, a partially sectioned front view of a chest-type cooler 12 illustrates the arrangement of container 10 within the interior 11 of cooler 12. Air is dispersed from aeration device 20 via diffuser 40 to aerate water contained within cooler 12. As shown, outer wall 30 of the bait aerating insert 10 is substantially vertical and supports an outer portion of body 13 upon the inside bottom wall 62 of cooler 12. Cooler 12 is preferably foam-filled, having an inner and outer water-resistant plastic skin 62 and 64, respectively. Since cooler 12 is insulated, the interior is insulated from extreme exterior weather conditions, such as extreme temperatures or direct sunlight as well as sub-zero temperatures. An insulation 66 disposed between plastic skins 62 and 64 is preferably comprised of polystyrene insulation; however, limitation to this specific type of insulation is not to be inferred.

Body 13 has four Dual-Lock ® reclosable fasteners 70 which are selectively attachable to four corresponding fasteners 72, (see FIG. 3) which are positioned at a central portion of an inside skin or wall 74 of cooler 12 to secure body 13 to that wall. Lower portion 38 of wall 30 rests upon the interior bottom wall of cooler 12 to thereby support an outer portion of body 13 with the assembly being held in place by reclosable fasteners 70 and 72. Bottom surface 42 of the insert 10 is positioned above the bottom of cooler 12 to provide compartments 14 and 16 having only a moderate depth. Wall 30 is designed to continuously extend laterally from one wall of cooler 12 to the other wall such that live bait cannot hide behind wall 30 or between apparatus 10 and the adjacent walls of cooler 12. Apparatus 10 could also have a smaller body 13 such that apparatus 10 can be positioned in a corner of cooler 12, and limitation to body 13 continuously extending from one wall of cooler 12 to the other is not to be inferred. Thus, apparatus 10, as shown, is preferably custom designed to have dimensions suited to specified coolers having known dimensions. For example, a larger body 13 would be designed for a larger cooler 12.

Lid 80 of the chest-type cooler 12 sealingly engages a top edge of the cooler to provide a substantially airtight seal between its interior 11 and the ambient. Typically, there is sufficient oxygen contained within cooler 12, above the water surface, in combination with air holes 57 and 61 defined through lifts 56 and 60, such that aeration device 20 can support minnows for periods up to a week without removing lid 80. Handles 84 are pivotally attached to opposite outer sides of cooler 12 and provides a means for carrying the cooler 12.

Figure 3:
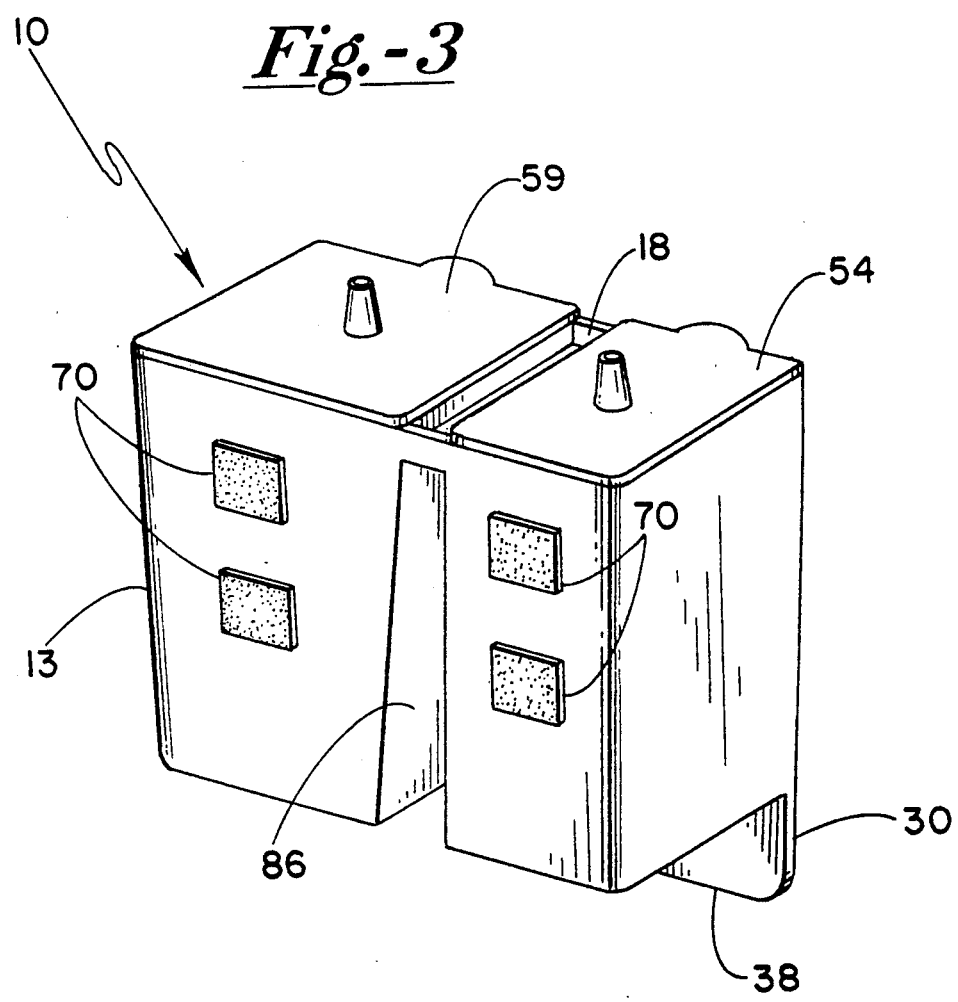
FIG. 3 is a perspective view of the invention illustrating the design of the integrally formed minor compartments and the attachment means comprising Dual-Lock ® reclosable fasteners for attaching the invention to the inner wall of the cooler.

As can be seen in FIG. 3, reclosable fasteners 70 are attached to an outer surface of each outer vertical wall of each compartment 14 and 16, opposite common wall 30, and is aligned with and securingly attachable to reclosable fasteners 72 defined on inner wall 74 of cooler 12. An alternative method of attaching body 13 to cooler 12 could comprise eliminating lower portion 38 of wall 30, and placing fasteners 70 and 72 on bottom surface 42 of body 13 and an inner bottom surface of cooler 12, respectively. Hence, limitation to placing reclosable fasteners on vertical walls of body 13 is not to be inferred. A vertical trapezoidal recess 86 defined between compartment 14 and 16 provides structural support and helps isolate vibration of aeration device 20 within first compartment 14 from compartment 16. Also as shown, compartment 16 is larger than compartment 14 since compartment 14 only needs to be large enough to receive aeration device 20.

Further, since body 13 is selectively attachable to inner wall 74 of cooler 12 using Dual-Lock ® or other suitable fasteners 70 and 72, body 13 can be removed to facilitate cleaning of the invention and the cooler, and can be transferred from one specified cooler to another specified cooler, thus making the invention portable.

Referring back to FIG. 2, the volume consumed by compartments 14 and 16 is substantially smaller than the remaining volume of reservoir 11 of cooler 12 thus leaving a large amount of space for receiving water and live bait.

In summary, the present invention provides a combination dry storage and aeration device which is easily adapted to a specified of commercially available, off-the-shelf chest-type coolers. The device is inexpensive and has substantially reduced tooling costs since the container can be manufactured using plastic molding injection. The invention is multi-purpose, as it provides both an aeration device for aerating water contained within a cooler, and it also provides a dry storage compartment for storing either dry bait such as nightcrawlers, or for storing food such as snacks and beverages.

This invention has been described in this application in considerable detail in order to comply with the Patent Statutes and to provide those skilled in the art with the information needed to apply the novel principles and to construct and use such specialized components as are required. However, it is to be further understood that the invention can be carried out by specifically different equipment and devices and that various modifications, both as to equipment details and operating procedures, can be accomplished without departing from the scope of the invention itself.

What is claimed is:

1. A combination bait container and aerator apparatus adapted to be received into a housing formed of thermally insulative material entirely covered with a water impermeable skin, said housing having a plurality of inner surfaces defined by several side walls and a bottom member defining a major compartment for holding water, said housing adapted to contain a quantity of water and further including a cover for mounting over the top of the housing, said aerator apparatus comprising:

(a) a separable insert adapted to be selectively received into said major compartment of said housing and selectively attached to one of said inner surfaces, said insert having a plurality of minor compartments formed therein, each minor compartment opening only to the top thereof, said insert having a first side wall including a fastening means disposed on an outer surface thereof, said fastening means adapted to be attached to one of said side walls of said housing and a second side wall disposed opposite said first side wall, wherein said second side wall extends beyond a bottom of said insert for supporting an outer portion of said insert off said bottom member of said housing; and (b) battery-powered pump means disposed in a first one of said minor compartments and coupled in air flow communication with said major compartment of said housing for supplying air to the water contained in said major compartment and thereby aerating the water.

2. The combination bait container and aerator apparatus as specified in claim 1 wherein said apparatus further includes vibration dampening means disposed between said pump means and an adjacent inner wall of said first one of said minor compartments for reducing vibration from said pump means to said insert.

3. The combination bait container and aerator apparatus as specified in claim 2 wherein said vibration dampening means is disposed about and selectively removable from said pump means.

4. The combination bait container and aerator apparatus as specified in claim 2 wherein said insert includes a plurality of cover members each mounting over one of said minor compartments.

5. The combination bait container and aerator apparatus as specified in claim 1 wherein said pump means is operatively coupled to said major compartment of said housing by tubing passing through an outer wall of said first one of said minor compartments and terminating at an open distal end located proximate said bottom surface of said housing.

6. The combination bait container and aerator apparatus as specified in claim 5 wherein said distal end of said tubing is fixedly attached to a lower portion of said outer wall of said first one of said minor compartments, said distal end being coupled to a diffuser to diffuse air into the water.

7. The combination bait container and aerator apparatus as specified in claim 1 wherein said fastening means comprises Dual-Lock ® reclosable fasteners.

8. The combination bait container and aerator apparatus as specified in claim 1 wherein said insert is formed of plastic.

9. The combination bait container and aerator apparatus as specified in claim 1 wherein said insert is adapted to consume a volume less than a total volume of said major compartment of said housing.

* * * * *